G. TAUSSIG.
METHOD OF COLORING MOTION PICTURE FILMS.
APPLICATION FILED MAR. 19, 1921.

1,398,286.

Patented Nov. 29, 1921.

INVENTOR
Gottlieb Taussig.
BY Jas. H. Griffin
ATTORNEY

UNITED STATES PATENT OFFICE.

GOTTLIEB TAUSSIG, OF NEW YORK, N. Y.

METHOD OF COLORING MOTION-PICTURE FILMS.

1,398,286.   Specification of Letters Patent.   Patented Nov. 29, 1921.

Application filed March 19, 1921. Serial No. 453,560.

*To all whom it may concern:*

Be it known that I, GOTTLIEB TAUSSIG, a citizen of the United States, residing at New York city, borough of Bronx, in the county of Bronx and State of New York, have invented a certain new and useful Method of Coloring Motion-Picture Films, of which the following is a specification.

This invention is a method of coloring motion picture films, and, speaking generally, the object of the invention is to color different parts of the film in one or more colors with a view to having various parts of the projected picture simulate their natural appearance.

In the accompanying drawings, I have illustrated one practical manner of carrying out the method of this invention, but it will be understood that the showing therein made is for illustrative purposes only and does not define the limits of the invention.

Figure 1:
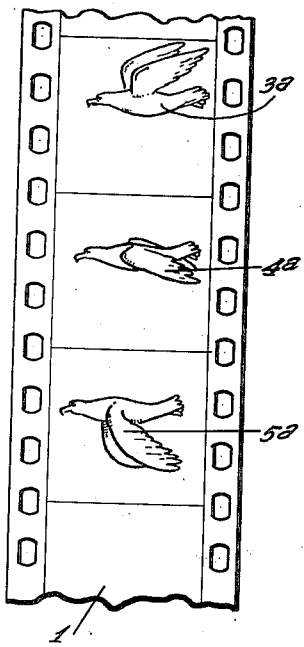
Figure 1 is a positive film to be colored.

While the method of this invention may be employed in coloring different parts of a film in different colors, the drawings illustrate the manner in which various parts of a film may be colored in a single color and the remainder of the film left in its natural shade of gray. This manner of presentation is chosen in the interests of clearness and it is not intended to restrict the invention to the application of a single color.

In practising the method of this invention, I start with a developed negative film, not shown in the drawings, and after obtaining this film, the method of procedure is as follows:

First. From the negative film a positive film 1, shown in Figure 1 of the drawings, is produced. This positive film is the one to be subsequently used for projecting purposes and forms the commercial film, which it is desired to color. In printing the positive 1 from the negative, the negative and the positive film 1 are printed with the emulsion sides of both films in contact and this having been accomplished the positive film 1 is developed in the usual manner.

Figure 2:
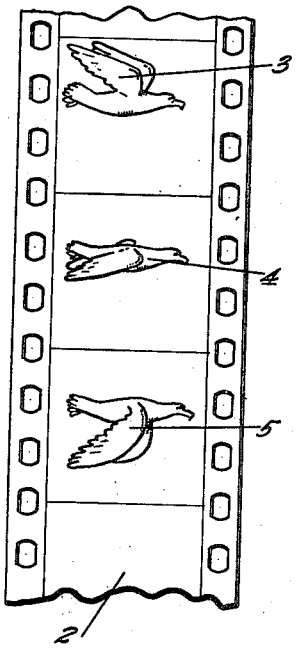
Figs. 2 and 3 show different stages of a portion of the printing film or the film by means of which the color is applied to the film shown in Fig. 1; and, Fig. 4 shows the manner of printing the film of Fig. 1 through the employment of the printing film of Fig. 3.

Second. From the negative film employed in producing the positive 1, I next print a second positive film 2, but in the printing of this second positive film, the negative film is reversed so that the celluloid side of the negative will be in contact with the emulsion side of the positive 2. The positive 2, when printed, will appear reversed, as shown in Fig. 2. The reverse positive 2 is also developed in the usual manner.

Figure 3:
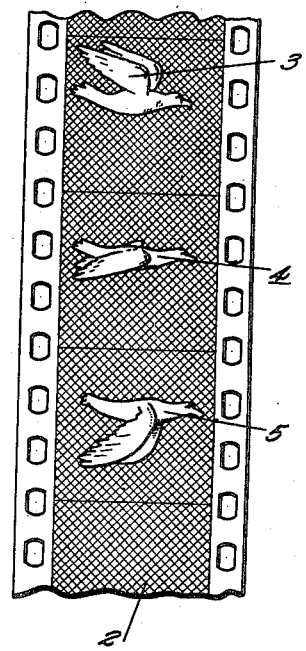

Third. After the reverse positive 2 has been developed, I proceed to block out on the emulsion side of the reverse positive 2, the parts of the film which it is not desired to color. We will assume that the film shows a bird in flight, and in the drawings three positions of the bird are shown, designated, respectively, 3, 4 and 5 on the reverse positive 2. In blocking out, I apply to the emulsion side of the film a coating of gun cotton solution commonly called pyroxylin, preferably tinted to facilitate its application and transparent. The gun cotton solution is applied to all parts of the emulsion side of the reverse negative, except those portions thereof corresponding to the parts to be colored on the positive 1. Specifically, the solution is applied to all parts of the reverse positive except to the figure of the bird as shown at 3, 4 and 5. After this has been accomplished, the reverse positive will appear as shown in Fig. 3, wherein the cross hatching designates the gun cotton solution, and wherein it will be noted that the gun cotton solution is not applied to the different positions 3, 4 and 5 of the bird. The gun cotton solution dries very rapidly and the reverse film is shown in Fig. 3 as allowed to thoroughly dry before proceeding with the next step of the process.

Fourth. After the reverse positive, coated as described, has become thoroughly dry, color is applied to the emulsion side of the reverse positive 2, and after a relatively short period or duration of time, the film coated with color is passed between cleaning rolls or operated upon in any other suitable manner to remove the superfluous color. It is found in practice that the color may be entirely removed from those portions of the film which are coated with the gun cotton solution, but it will adhere or be absorbed into the other portions of the emulsion of the film which are not coated with the gun cotton solution. At the conclusion of the cleaning operation, the figures 3, 4 and 5 will retain the coloring material, while all other parts of the film will be cleared of color.

Fifth. These operations having been accomplished, the positive film 1 and the color carrying reverse positive 2 are now brought into face abutting contact. That is to say, the color carrying emulsion surface of the reverse positive 2 is brought into contact with the emulsion side of the positive 1. In practice, this operation may be conveniently and expeditiously carried out by machinery which serves to feed the two films 1 and 2 between pressure rolls 6 and 7, while the films are maintained in such relation that the characters 3, 4 and 5 of the reverse film 2 will be in perfect registration with the corresponding characters 3ª, 4ª and 5ª of the positive 1.

Figure 4:
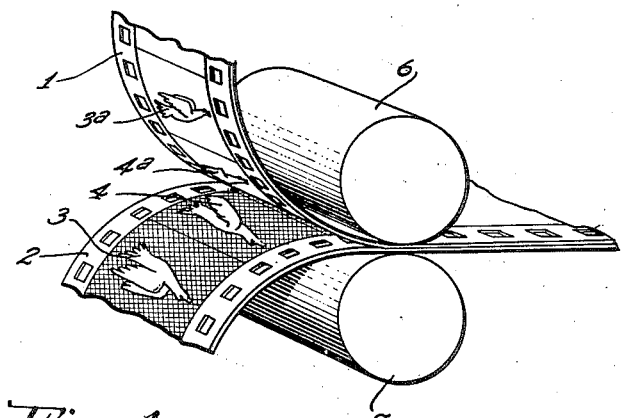

When the two films 1 and 2 are brought together as shown in Fig. 4, the film 2 which carries the color becomes the printing film and the color carried by the characters 3, 4 and 5 will impinge, adhere to and be absorbed by the characters 3ª, 4ª and 5ª, so that in this manner, the characters on the film 1 become colored.

After passing the films between the pressure rolls to accomplish the printing operation, the film 1 is allowed to dry, whereupon it is ready for use in projecting apparatus and may be employed in the conventional way.

In the accompanying drawings, only fragmental views of the films are shown, and only three different positions of the picture are delineated. It will be understood, however, that the process described is carried out in like manner throughout the film, and, in practice, different parts of the same film which are to be colored in the same color may be thus operated upon during one printing operation. If it is desired to print different colors, for instance red and green, a reverse positive printing film will be employed for the printing of each separate color and will be passed through a separate printing operation upon the commercial film 1.

I have described the present method as particularly adapted for coloring motion picture films, but I am aware that it may be employed with equal advantage in the coloring of stationary slides or single picture films without departing from this invention, and the claims are accordingly to be thus construed.

Having thus fully described the invention, what I claim as new and desire to secure by Letters Patent is:

1. The method of coloring films which consists in printing and developing a positive film from a negative, then printing a reverse positive film from the same negative, thereafter coating the emulsion surface of the reverse positive with a gun cotton solution which covers all portions of the emulsion side of the reverse positive, except those portions corresponding to the portions of the positive which it is desired to color, then applying color to the coated side of the reverse positive, thereafter removing the color from all parts of the reverse positive except from the uncoated portions thereof, and finally bringing the emulsion side of the reverse positive into contact with the emulsion side of the positive while maintaining the characters of the reverse positive and of the positive in registration, whereby the color carrying reverse positive serves to print or color the positive.

2. The method of coloring films which consists in taking a positive and a reverse positive, blocking out all those parts of the reverse positive except those from which it is desired to print, then applying color to those parts of the reverse positive which were not blocked out, then bringing the colored face of the reverse positive into registering engagement with the emulsion face of the positive, thereby coloring those parts of the positive corresponding to the colored parts of the reverse positive.

In testimony whereof I have signed my name to this specification.

GOTTLIEB TAUSSIG.